United States Patent

[11] 3,581,857

[72] Inventor Robert J. Dallman
 Milwaukee, Wis.
[21] Appl. No. 860,600
[22] Filed Sept. 24, 1969
[45] Patented June 1, 1971
[73] Assignee North American Clutch Corp.
 Milwaukee, Wis.

[54] ONE-WAY CENTRIFUGAL CLUTCH
 8 Claims, 3 Drawing Figs.
[52] U.S. Cl. .................................................. 192/41,
 192/76, 192/105, 192/114
[51] Int. Cl. ........................................................ F16d 13/04,
 F16d 43/24
[50] Field of Search ......................................... 192/41,
 105B, 75, 76, 114

[56] References Cited
 UNITED STATES PATENTS
 2,762,483 9/1956 Clark ............................ 192/41(X)
 2,894,611 7/1959 Chappuis ..................... 192/41
 2,970,680 2/1961 Cain ............................. 192/41(X)

*Primary Examiner*—Allan D. Herrmann
*Attorney*—Andrus, Sceales, Starke & Sawall ABSTRACT: A centrifugal clutch assembly including a drive shaft driven by a reversible motor. The shaft carries a hub having a pair of diametrically opposed driving elements which are located within complimentary recesses in shoes, and the shoes are located within a drum connected to the output member.

When the motor is rotated in one direction, a radial surface of the driving element engages a radial wall of the recess of the corresponding shoe to rotate the shoe, while permitting the shoe to move outwardly by centrifugal force to engage the inner surface of the drum and provide a driving connection between the input shaft and the output member.

When the motor is operated in the opposite direction, a second surface of the driving element engages a wall of the recess of the corresponding shoe to rotate the shoe, and a locking feature is provided whereby the engagement of the second surface with the recess wall locks the shoe against radial outward movement and provides a freewheeling condition for the output member.

PATENTED JUN 1 1971

3,581,857

INVENTOR.
Robert J. Dallman

BY Andrus, Sceales, Starke & Sawall

Attorneys

ONE-WAY CENTRIFUGAL CLUTCH

This invention relates to a centrifugal clutch assembly and more particularly to a clutch assembly for use with a reversible motor.

Centrifugal clutches are often incorporated with reversible drive mechanisms to provide a driving connection between the motor and an output member, when the motor is rotated in one direction, and to disengage the driving connection and provide a freewheeling condition for the output member when the motor is rotated in the opposite direction. For example, in a household washing machine, the motor is connected directly to the agitator and is also connected through a clutch assembly to the spinning basket of the machine. When the motor is operated in one direction the clutch assembly will provide a driving connection to drive the basket in conjunction with rotation of the agitator. When the motor is operated in the opposite direction the clutch will disengage the driving connection to the basket so that only the agitator will rotate.

In one common type of centrifugal clutch, the clutch shoes, are thrown outwardly by centrifugal force when the motor is operated in one direction, and are moved inwardly, when the motor is rotated in the opposite direction, by springs. In another common type of centrifugal clutch the shoes are moved inwardly to provide a disengaged condition by a wedging action provided by sprags. With these conventional centrifugal clutch constructions, there is often some contact between the shoes and the drum when the clutch is in the disengaged position. This contact provides a drag, generates heat and causes undue wear of the clutch shoes as well as the drum.

The present invention is directed to a centrifugal clutch assembly to be associated with a reversible drive member in which the clutch acts, when the drive member is rotated in one direction, to provide a positive driving connection to the output member and which acts, when the motor is operated in the reverse direction, to provide a complete freewheeling condition. More specifically, the clutch assembly of the invention includes a drive shaft to be driven by a reversible motor and the shaft carries a hub having a pair of diametrically opposed generally L-shaped driving elements. Each driving element includes a base portion which extends radially outward from the hub and terminates in a nose which extends generally circumferentially. Each nose is adapted to be engaged within a complimentary recess in a clutch shoe and the shoes are located within a drum connected to the output member.

When the motor is rotated in one direction, a radial surface of the base portion of each driving element engages a radial wall of the recess in the shoe to rotate the shoe, while permitting the shoes to move outwardly by centrifugal force and into engagement with the drum surface to provide a driving connection between the input shaft and the drum. When the motor is reversed, the noses of the driving elements move into engagement with the recesses in the shoes to rotate the shoes and lock the shoes against outward radial movement, thereby providing a freewheeling condition in which the peripheral surfaces of the shoes are entirely out of contact with the drum.

The clutch assembly of the invention provides a positive drive between the rotating input member and the output member when the input member is rotated in one direction. When the input shaft is rotated in the opposite direction, a completely freewheeling condition is achieved in which the outer surfaces of the shoes are completely free of contact with the drum surface. As there is no contact between the shoes and the drum when in the freewheeling condition, there is no tendency to generate heat or cause undue wear on the shoes or drum.

The clutch construction of the invention eliminates springs, sprags and other auxiliary elements which are generally employed in conventional clutch constructions to return the shoes to the inner or disengaged position. As these elements are eliminated, the overall number of parts required for the clutch assembly is reduced and the time and cost of assembly is similarly decreased. As the clutch construction of the invention has fewer parts, less maintenance is required and greater service reliability is achieved.

As a further advantage, the clutch construction of the invention provides a gradual engagement, rather than an instantaneous engagement, and this enables the motor to pick up the load slowly and smoothly.

Other objects and advantages will appear in the course of the following description.

The drawings illustrate the best mode presently contemplated of carrying out the invention.

Figure 2:
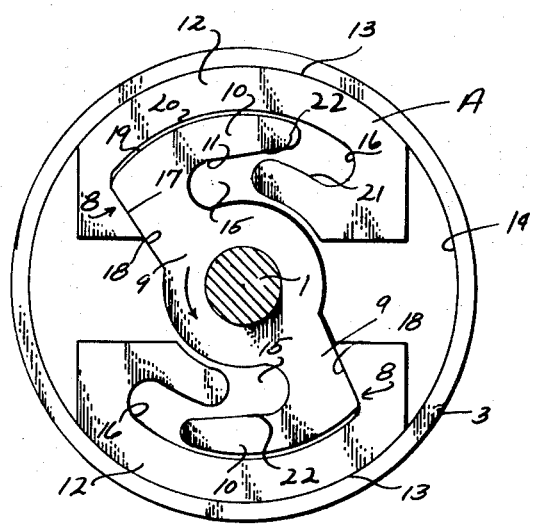
FIG. 2 is a section taken along line 2-2 of FIG. 1; and showing the clutch in the engaged position.

The drawings illustrate a centrifugal clutch assembly to be associated with a drive shaft 1 driven by a reversible electrical or hydraulic motor. Shaft 1 carries a pulley 2 which can be connected by a belt, not shown, to a suitable member to be driven.

The clutch assembly also includes a drum 3 and the base 4 of the drum is journaled around the shaft 1 by a bearing 5. A second pulley 6 is connected to the base 4 of the drum and can be connected by a belt, not shown, to a second output member.

Figure 3:
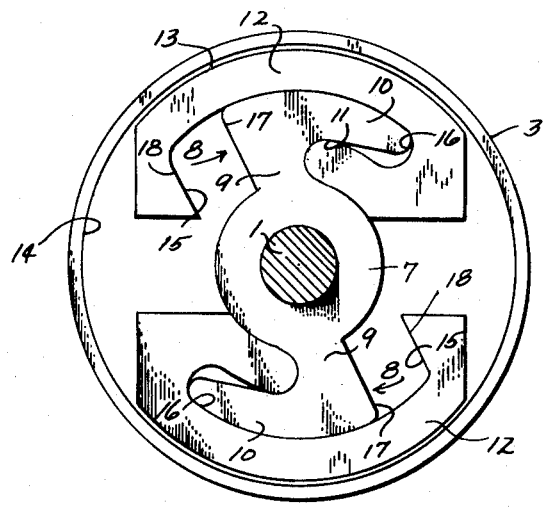
FIG. 3 is a view similar to FIG. 2 showing the clutch in the disengaged position.

A hub 7 is keyed or otherwise secured to the shaft 1 and a pair of generally hooklike projections or driving elements 8 extend outwardly in diametrically opposite positions from the hub 7. Each of the driving elements 8 includes a base portion 9 which extends radially outward and terminates in a nose 10 which extends circumferentially. As shown in FIGS. 2 and 3, each nose 10 in combination with the outer surface of the hub 7 defines a generally circumferential extending recess 11 and the nose 10 and recesses 11 of each driving element face in the opposite direction.

The nose portions 10 have a generally constant width throughout their length and terminate in rounded ends.

Each of the driving elements 8 is associated with a clutch shoe 12 which is to be moved between an engaged and disengaged position. When the shoes 12 are in the engaged position the outer peripheral surfaces 13 of the shoes are in contact with the inner wall 14 of the drum 3, to thereby provide a driving connection between the shoes and the drum.

Each of the shoes 12 is provided with a relatively large, radially extending recess 15 which receives the base portion 9 of the respective driving element 8. In addition, a recess 16 extends circumferentially and communicates with the recess 15. In the disengaged position, the nose portions 10 of the driving elements 8 are adapted to be received within the recesses 16 of the shoes.

Figure 1:
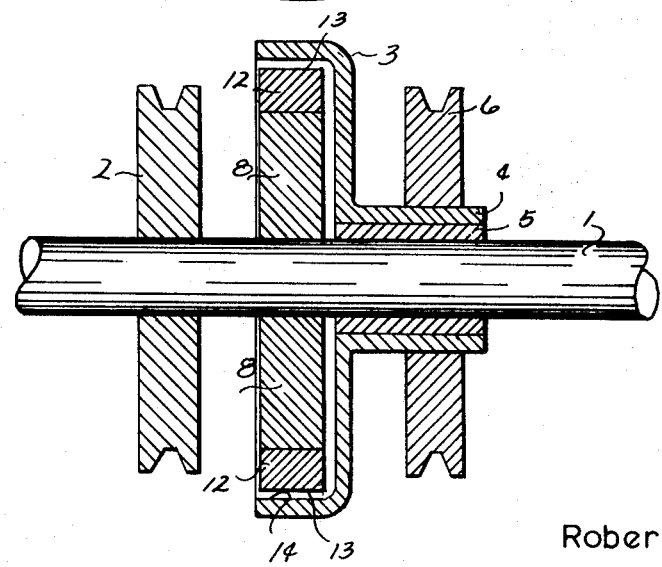
FIG. 1 is a longitudinal section of the clutch construction of the invention.

When the shaft 1 and hub 7 are rotated in the direction of the arrow, as shown in FIG. 1, the end surface 17 of the base 9 of element 8 engages the wall 18 bordering recess 15 of the shoe, to thereby rotate the shoe in accordance with rotation of the drive shaft 1. As the speed of rotation increases, the engagement of end surface 17 with wall 18 will tend to pivot the rear end portion, indicated by A, of the shoes outwardly so that the portion A will move into contact with the wall 14 of the drum. This engagement of the portion A with the drum wall 14 enables the load to be picked up slowly and gradually. As the motor comes up to its operating speed, the centrifugal force will throw the shoes 12 outwardly so that the entire peripheral surface 13 will be in engagement with the drum wall 14 to provide a driving connection between the shoe and the drum. In this engaged position, the outer surface 19 of nose 10 will be spaced inwardly from the surface 20 bordering recess 16 of the shoe, as shown in FIG. 1.

When rotation of the motor is stopped, the shoes 12 and elements 8 will still be in the position as shown in FIG. 1, with the end surface 17 being engaged with the wall 18. In this nonoperating position, the outer peripheral surface 13 of the shoes may in some cases still be in engagement with the wall 14 or may be spaced slightly inward of the drum wall.

When the direction of rotation of the motor is reversed so that the shaft 1 and hub rotate in the direction of the arrow in FIG. 3, the nose portions 10 will initially move into the recesses 16 of the shoes 12 and engagement of the nose portions with the recesses 16 will cause the shoes to rotate in accordance with rotation of the shaft 1. However, in this position the surface 21 of the shoe 12 bears against the inner surface 22 of the nose 10 and prevents the shoe from moving radially outward by centrifugal force. Thus, the shoes are locked against outward radial movement with the outer surface 13 of the shoes being spaced inwardly of the drum wall 14 as shown in FIG. 3. As the surface 13 is entirely out of contact with the wall 14, a true freewheeling condition is achieved in which there is no contact between the shoe and the drum. This true freewheeling condition prevents heat generation between the surfaces and eliminates any possible drag when the motor is operated in the direction as shown by the arrow in FIG. 3.

With the clutch construction of the invention the shoes are automatically moved inwardly out of engagement with the drum by the wedging action of the nose portions 10 moving into the recesses 16. Thus, the clutch construction eliminates the use of any auxiliary springs, sprags or other members commonly used in clutch constructions to return the shoes to the inner or disengaged position. By eliminating these auxiliary parts, the overall cost of the clutch is reduced and greater service life and reliability is achieved.

As previously mentioned, the clutch construction of the invention enables the load to be picked up gradually rather than instantaneously. The initial engagement of the end surface 17 with the wall 18 provides a pivotal movement which forces the end potion A of the shoe into engagement with the wall of the drum so that the load will be picked up slowly and smoothly. As the motor comes up to operating speed, the entire outer surface of the shoes will be moved into contact with the drum wall to provide a positive driving connection between the members.

I claim:

1. A clutch construction, comprising a reversible input member, a driving element connected to said input member and including a first generally radially extending driving surface and a second driving surface spaced circumferentially from said first driving surface, an output member spaced outwardly of said driving element, a shoe disposed within the space between said driving element and said output member and having a generally radially extending first driven surface and a second driven surface, said first driving surface arranged to engage said first driven surface of said shoe when the input member is rotated in one direction to thereby rotate said shoe in accordance with rotation of said input member, said shoe being disposed to move freely in a radial direction with respect to said driving element when said first driving surface is in engagement with said first driven surface to enable said shoe to move radially outward by centrifugal force and provide a driving connection to said output member, said second driving surface arranged to engage said second driven surface of said shoe when the input member is rotated in the opposite direction to thereby rotate said shoe in said opposite direction, and locking means for preventing free outward radial movement of said shoe when second driving surface is in engagement with said second driven surface to thereby space the shoe from said output member and provide a freewheeling condition for said output member.

2. The clutch construction of claim 1, wherein said locking means comprises interlocking projections and recesses disposed on said second driving surface and said second driven surface.

3. The clutch construction of claim 1, wherein said locking means comprises a circumferentially extending projection on said second driving surface, and a circumferentially extending recess formed in said second driven surface to receive said projection when said input member is rotated in said opposite direction.

4. A clutch construction, comprising a reversible drive member, a driving element connected to the drive member and including a base extending generally radially outward from the drive member and including an outer portion connected to said base and extending generally circumferentially, an output member located outwardly of said drive member, a shoe located within the space between the drive member and the output member, the inner portion of said shoe having a generally radially extending first recess to receive the base portion of said driving element, the circumferential dimension of said first recess being substantially greater than the circumferential dimension of the base portion, said shoe also having a second generally circumferentially extending recess connected to said first recess and disposed to receive said outer portion of the driving element, said base arranged to engage the wall of said shoe bordering the first recess when the drive member is rotated in one direction to thereby rotate said shoe in accordance with rotation of said drive member, the engagement of said base with said wall permitting free outward radial movement of shoe under centrifugal force to provide a driving connection between said input member and said output member when said drive member is rotated in said first direction, rotation of said drive member in the opposite direction resulting in engagement of said outer portion with said second recess to thereby rotate said shoe in accordance with rotation of said drive member and lock said shoe against free outward radial movement and provide a freewheeling condition for said output member.

5. The clutch construction of claim 4, and including a pair of diametrically opposed driving elements, and a shoe associated with each driving element.

6. The clutch construction of claim 5, wherein said outer portion of each driving element extends circumferentially in the same direction.

7. The clutch construction of claim 4, wherein said outer portion has a substantially uniform radial dimension throughout its circumferential extent.

8. The clutch construction of claim 4, wherein the circumferential dimension of said first recess is greater than the circumferential dimension of said second recess.